United States Patent
Chen et al.

(10) Patent No.: US 12,199,505 B2
(45) Date of Patent: Jan. 14, 2025

(54) LLC RESONANT CONVERTER WITH VARIABLE RESONANT TANK

(71) Applicant: PHIHONG TECHNOLOGY CO., LTD., Taoyuan (TW)

(72) Inventors: Chun-Chen Chen, Taoyuan (TW); Jian-Hsieng Lee, Taoyuan (TW); Yao-Chun Tung, Taoyuan (TW)

(73) Assignee: PHIHONG TECHNOLOGY CO., LTD., Taoyuan (TW)

( * ) Notice: Subject to any disclaimer, the term of this patent is extended or adjusted under 35 U.S.C. 154(b) by 242 days.

(21) Appl. No.: 17/966,837

(22) Filed: Oct. 15, 2022

(65) Prior Publication Data
US 2024/0079953 A1 Mar. 7, 2024

(30) Foreign Application Priority Data
Sep. 5, 2022 (TW) ................... 111133572

(51) Int. Cl.
*H02M 1/12* (2006.01)
*H02M 3/00* (2006.01)

(52) U.S. Cl.
CPC ............. *H02M 3/015* (2021.05); *H02M 1/12* (2013.01)

(58) Field of Classification Search
CPC ........ H02M 3/01; H02M 3/015; H02M 3/335; H02M 3/33507; H02M 3/33538; H02M 3/33546; H02M 3/33569; H02M 3/33573
See application file for complete search history.

(56) References Cited

U.S. PATENT DOCUMENTS

| | | | |
|---|---|---|---|
| 11,588,398 B1 * | 2/2023 | Huang | H02M 3/33571 |
| 2017/0294844 A1 * | 10/2017 | Nishijima | H02M 3/33571 |
| 2023/0307918 A1 * | 9/2023 | Ginart | H02M 3/33573 |

* cited by examiner

*Primary Examiner* — Gary L Laxton
(74) *Attorney, Agent, or Firm* — Chih Feng Yeh; Yongjean Consulting Inc.

(57) ABSTRACT

An LLC resonant converter with variable resonant tank includes a switching circuit for converting a DC voltage into switching signal, a variable resonant tank coupled to the switching circuit for receiving the switching signal to provide a primary current, a transformer circuit having a primary and a secondary side winding, and a rectifying/filtering circuit to rectifying and filtering a secondary current. The variable resonant tank is coupled between the switching circuit and the transformer circuit, which includes a variable resonant inductor, a magnetizing inductance and a resonant capacitor coupled in series for dynamically adjusting the gain curve of the LLC resonant converter according to the demand of the output current.

20 Claims, 6 Drawing Sheets

LLC RESONANT CONVERTER WITH VARIABLE RESONANT TANK

CROSS-REFERENCE STATEMENT

The present application is based on, and claims priority from, Taiwan Patent Application Number 111133572, filed Sep. 5, 2022, the disclosure of which is hereby incorporated by reference herein in its entirety.

BACKGROUND

Technical Field

The present invention relates to an LLC resonant converter, and more particularly, an LLC resonant converter with variable resonant tank.

Related Art

In conventional switching power supplies, their magnetic components are usually employed for filtering, energy storage and transmission purposes. During the operation of the switching power supply, the higher switching frequency of the switching device, the smaller size of the magnetic element can be realized, and it is easier to achieve miniaturization, weight reduction and cost reduction of the power supply device. Increasing the switching frequency of the switching power supply will also correspondingly increase the switching loss of the switching device, so the soft-switching technology emerges as the time being evolved. To achieve ideal soft switching, the best scenario is to have the switching device turn off and on when both the voltage and current are zero (zero-voltage switching, ZVS; zero-current switching, ZCS), so that the loss occurred is really zero. For achieving this purpose, a resonance technology must be utilized.

Based on the principle of the circuitry operation, an inductor and a capacitor can be connected in series or in parallel to form a resonant circuit, when the power supply is a DC power supply, the current in the resonant circuit changes according to a sinusoidal law. Since the current or voltage varies based on the sinusoidal law, there is a zero-crossing point, and if the switching device is turned on or off at this moment, the resulting loss is zero.

The LLC resonant converter is a resonant inverter with three reactive elements where the DC input voltage is turned into a square wave by a switch network arranged as either a half- or full-bridge to feed the resonant LLC tank that effectively filters out harmonics providing a sinusoidal like voltage and current waveform. This in turn feeds a transformer that provides voltage scaling and primary-secondary isolation. The converter power flow is controlled by modulating the square wave frequency with respect to the tank circuit's resonance. In an LLC resonant converter, all semiconductor switches are soft-switching, or zero-voltage switching (ZVS), at turn-on for the primary MOSFETs and zero-current switching (ZCS) at both turn-on and turn-off for the rectifiers in the secondary; resulting in low electromagnetic emissions levels (EMI). In addition, it can enable a high degree of integration in the magnetic parts, enabling the design of converters with higher efficiency and power density.

An LLC resonant converter is a topology of a series resonant converter that provides an output voltage signal that is isolated from the input signal. The LLC resonant converter includes a series resonant circuit connected in series with the primary winding of the transformer. A switching circuit alternately couples the switching node of the resonant circuit to the positive supply node and the ground node to provide an AC resonant current flowing through the primary winding of the transformer. A secondary circuit, such as a rectifier, provides the output voltage to drive a load. Where the secondary circuit may comprise a synchronous rectifier switch or a diode rectifier. The primary side switching circuit can be adjusted to regulate the output voltage. The LLC resonant converter has high efficiency and high power density, and can provide zero-voltage switching and low turn-off current for primary side switches over a fairly wide load range. These advantages make the LLC resonant converter suitable for a variety of applications, such as high-performance servers and telecom applications.

As mentioned earlier, when the primary side switching frequency is lower than the resonant frequency, the primary side switches can be turned off with zero current switching. This helps increasing the capability of voltage gain without reducing the efficiency of applications with hold-up time requirements. The size of the magnetic elements and capacitors of the LLC resonant converter can be reduced while operating the LLC resonant converter at high switching frequencies. However, this increases switching-related losses and magnetic-component losses, resulting in inefficiencies. Magnetic components used in the LLC resonant converter remain as a limitation in improving converter efficiency due to core and winding losses, especially at high switching frequencies. Further improvements are required to support higher efficiency and power density of the LLC resonant converter.

Once the resonant tank design of the LLC resonant converter is finalized, in the case that the output voltage or current needs to be adjusted, the desired gain value of which can be achieved by changing the operating frequency. However, once the output voltage or current requirement exceeds the original resonant tank design, the power converter cannot be operated, therefore it is very important to widen the output voltage or current ranges of the LLC resonant converter.

When the LLC resonant converter has been designed and finalized, its resonant tank parameters are fixed, and the range of output voltage and output current are fixed. If the desired output voltage or current exceeds the original designed values, because the resonant tank parameters cannot be further changed, the power converter cannot output the corresponding voltage or current. How to adjust the parameters of the resonant tank to meet the required wider output voltage current is the currently developing trend of the LLC resonant converter.

Therefore, to regulate the output voltage or current range values of the LLC resonant converter by adjusting the resonant tank parameters, for example, by changing the resonant inductance and the resonant capacitance has became an urgent need to improve the deficiencies of the existing LLC resonant converter.

SUMMARY

Based on the above rationales, the parameter design of the resonant tank is adjusted by changing the resonant inductance and capacitance, enabling that the ranges of output voltage or output current can be adapted in each output interval.

According to the design concept mentioned above, in one aspect of the present invention, an LLC resonant converter with variable resonant tank is proposed, which includes a switching circuit coupled to an input DC voltage for converting the input DC voltage into a switching signal; a variable resonant tank coupled to the switching circuit, the variable resonant tank including a variable resonant inductor, a variable magnetizing inductor and a variable resonant capacitor connected in series to receive the switching signal for providing a primary current; a transformer circuit with a primary winding and a secondary winding, wherein the primary winding is coupled to the resonant tank; and a rectifying and filtering circuit coupled to the secondary winding configured to rectify and filter a secondary current outputted by the secondary winding for providing an output voltage; wherein the variable resonant tank is used to dynamically adjust gain curve of the LLC resonant converter based on required output current of the LLC resonant converter; wherein one end of the variable resonant inductor is electrically connected to the switching circuit and another end of the variable resonant inductor is connected in series to the primary winding; wherein the variable magnetizing inductor is connected in series to the variable resonant inductor, the variable resonant capacitor with one end is connected in series to the magnetizing inductor and the primary winding and with another end is connected to the switching circuit; wherein the variable magnetizing inductor is connected in parallel to the primary winding.

In one preferred embodiment, the variable magnetizing inductor includes an magnetizing inductor with a fixed inductance value electrically coupled to a first inductor, the variable resonant inductor includes a resonant inductor with a fixed inductance value electrically coupled to a second inductor, and the variable resonant capacitor includes a resonant capacitor with a fixed capacitance value electrically coupled to a first capacitor; wherein the variable magnetizing inductor, the variable resonant inductor and the variable resonant capacitor are individually and dynamically adjusted through configuring a plurality of switches between the magnetizing inductor with a fixed inductance value and the first inductor, between the resonant inductor with a fixed inductance value and the second inductor, and between resonant capacitor with a fixed capacitance value and the first capacitor.

In one preferred embodiment, inductance value of the first inductor is leakage inductance of the transformer circuit or inductance of an external coupled inductor, inductance value of the variable magnetizing inductor is adjusted through changing windings of magnetic component of the variable resonant tank or through coupling external magnetic elements in series or in parallel.

In one preferred embodiment, the inductance value of the variable magnetizing inductor is dynamically adjusted by varying one of parameters of the variable resonant tank K, which is inductance ratio between resonant inductor and magnetizing inductor, enabling that the gain curve of the LLC resonant converter is dynamically varied according to the required output current of the LLC resonant converter.

In one preferred embodiment, the plurality of switches include transistor type switching devices, relays, or the like.

In one preferred embodiment, capacitance value of the first capacitor of variable resonant capacitor is a stray capacitance or capacitance of an external capacitor, capacitance value of the variable resonant capacitor is adjusted through changing coupling between the first capacitor and the resonant capacitor with fixed value in series or in parallel by configuring a plurality of switches between the first capacitor and the resonant capacitor with fixed value.

In one preferred embodiment, the capacitance value of the variable resonant capacitor is dynamically adjusted by varying one of parameters of the variable resonant tank Q, which is quality factor, enabling that the gain curve of the LLC resonant converter is dynamically varied according to the required output current of the LLC resonant converter.

In one preferred embodiment, inductance value of the second inductor of the variable resonant inductor is leakage inductance of the transformer circuit or inductance value of an external coupled inductor, inductance value of the variable resonant inductor is adjusted through changing windings of magnetic component of the variable resonant tank or through coupling external magnetic elements in series or in parallel by configuring a plurality of switches between the second inductor and the resonant inductor with fixed value.

In one preferred embodiment, the inductance value of the variable resonant inductor is dynamically adjusted by varying two parameters of the variable resonant tank Q and K, which are quality factor and inductance ratio respectively, enabling that the gain curve of the LLC resonant converter is dynamically varied according to the required output current of the LLC resonant converter.

In one preferred embodiment, the plurality of switches are configured to dynamically adjust inductance value of the variable magnetizing inductor, capacitance of the variable resonance capacitor and inductance value of the variable resonant inductor by sending resonance tank adjustment signals to the resonant tank and the transformer circuit through an external controller electrically coupled to the LLC resonant converter, according to received feedback of output voltage and feedback of output current respectively to adjust range of the output voltage and output current of the LLC resonant power converter.

According to another aspect of the present invention, an LLC converter with variable resonant tank, the LLC converter includes a switching circuit coupled to an input DC voltage for converting the input DC voltage into a switching signal; a variable resonant tank coupled to the switching circuit, the variable resonant tank including a variable resonant inductor, a variable magnetizing inductor and a variable resonant capacitor connected in series to receive the switching signal for providing a primary current; a transformer circuit with a primary winding and a secondary winding, wherein the primary winding is coupled to the resonant tank; and a rectifying and filtering circuit coupled to the secondary winding configured to rectify and filter a secondary current outputted by the secondary winding for providing an output voltage; wherein the variable resonant tank is used to dynamically adjust gain curve of the LLC resonant converter based on required output current of the LLC resonant converter; wherein one end of the variable resonant inductor is electrically connected to the switching circuit and another end of the variable resonant inductor is connected in series to the primary winding; wherein the variable magnetizing inductor is connected in series to the variable resonant inductor, the variable resonant capacitor with one end is connected in series to the magnetizing inductor and the primary winding and with another end is connected to the switching circuit; wherein the variable magnetizing inductor is connected in parallel to the primary winding; wherein the variable magnetizing inductor includes an magnetizing inductor with a fixed inductance value connected in parallel to a first inductor; wherein the variable resonant inductor includes a resonant inductor with a fixed inductance value connected in series to a second inductor; wherein the variable resonant capacitor includes a resonant capacitor with a fixed capacitance value connected in parallel to a first capacitor.

In one preferred embodiment, inductance value of the variable magnetizing inductor is adjusted by turning on or off a first switch coupled between the magnetizing inductor with a fixed inductance value $L_m$ and the first inductor $L_{m1}$, such that effective magnetizing inductor is set to be the $L_m$ in parallel with the $L_{m1}$ while turning on the first switch, and the effective magnetizing inductor is set to be the $L_m$ only while turning off the first switch.

In one preferred embodiment, capacitance value of the variable resonant capacitor is adjusted by turning on or off a second switch coupled between the resonant capacitor with a fixed capacitance value $C_r$ and the first capacitor $C_{r1}$, such that effective resonant capacitor is set to be the $C_r$ in parallel with the $C_{r1}$ while turning on the first switch, and the effective resonant capacitor is set to be the $C_r$ only while turning off the second switch.

In one preferred embodiment, inductance value of the variable resonant inductor is adjusted by turning on or off a third switch coupled between the resonant inductor with a fixed inductance value $L_r$ and the second inductor $L_{r1}$, such that effective resonant inductor is set to be the $L_r$ in series with the $L_{r1}$ while turning off the first switch, and the effective magnetizing inductor is set to be the $L_m$ only while turning on the third switch.

In one preferred embodiment, the inductance value of the variable magnetizing inductor is dynamically adjusted by varying one of parameters of the variable resonant tank K, which is inductance ratio between resonant inductance and magnetizing inductance, enabling that the gain curve of the LLC resonant converter is dynamically varied according to the required output current of the LLC resonant converter.

In one preferred embodiment, the capacitance value of the variable resonant capacitor is dynamically adjusted by varying one of parameters of the variable resonant tank Q, which is quality factor, enabling that the gain curve of the LLC resonant converter is dynamically varied according to the required output current of the LLC resonant converter.

In one preferred embodiment, the inductance value of the variable resonant inductor is dynamically adjusted by varying two parameters of the variable resonant tank Q and K, which are quality factor and inductance ratio respectively, enabling that the gain curve of the LLC resonant converter is dynamically varied according to the required output current of the LLC resonant converter.

In one preferred embodiment, a plurality of switches are configured to dynamically adjust inductance value of the variable magnetizing inductor, capacitance of the variable resonance capacitor and inductance value of the variable resonant inductor by sending resonance tank adjustment signals to the resonant tank and the transformer circuit through an external controller electrically coupled to the LLC resonant converter, according to received feedback of output voltage and feedback of output current respectively to adjust range of the output voltage and output current of the LLC resonant power converter.

In one preferred embodiment, the external controller is a microprocessor, a microcontroller, a digital signal processor or a computing device with similar functions.

In one preferred embodiment, the plurality of switches are switching devices, transistor type switches, relays or the like.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

As mentioned in the background section, when the LLC resonant converter has been designed and finalized, its resonant tank parameters are fixed, and the range of output voltage and output current are fixed. If the desired output voltage or current exceeds the original designed values, because the resonant tank parameters cannot be further changed, the power converter cannot output the corresponding voltage or current. How to adjust the parameters of the resonant tank to meet the required wider output voltage current is the currently developing trend of the LLC resonant converter.

Figure 1:
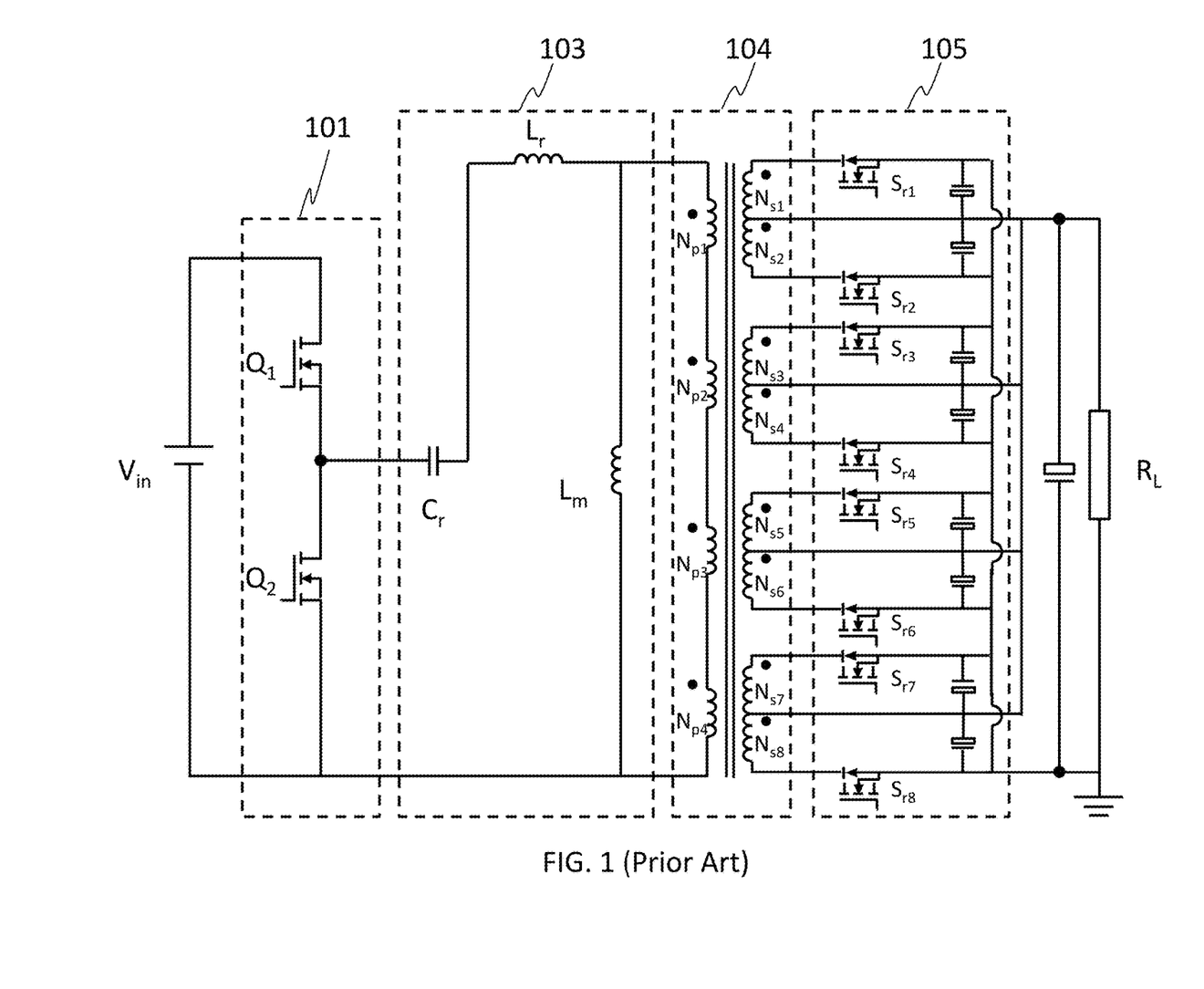
FIG. 1 illustrates a schematic diagram of an LLC resonant converter according to prior art.

FIG. 1 is a schematic circuit diagram of an existing LLC resonant converter 100, which adopts a half-bridge LLC resonant converter with an array transformer core integrated with synchronous rectification functionality. The LLC resonant converter is used to convert the DC input voltage $V_{in}$ into the DC output voltage $V_o$ for supplying to the load $R_L$, which includes a half-bridge switching circuit 101, a resonant tank 103, a transformer 104 and a rectifying and filtering circuit 105. The half-bridge switching circuit 101 is used to control the input of the DC voltage $V_{in}$. The resonant tank 103 is electrically coupled to the switching circuit 101 and includes a resonant inductor $L_r$, a magnetizing inductor $L_m$ and a resonant capacitor $C_r$ connected in series. The transformer 104 is electrically coupled to the resonant tank 103 and includes a magnetic core, primary side windings $N_{p1}, \ldots, N_{p4}$, and secondary side windings $N_{s1}, N_{s2}, \ldots, N_{s7}, N_{s8}$. The rectification form of the secondary side winding is center-tapped type rectifying circuit, which is rectified through the rectification switches $S_{r1}$, $S_{r2}$, ..., $S_{r7}$, $S_{r8}$ (This is just an example for rectification, the rectification form of the secondary winding is not limited to center tap, a rectification form utilized rectifier diodes can also be applied).

During the operation of the LLC resonant converter 100, the output/input nodes of the half-bridge switching circuit 101 are turned ON or OFF repeatedly due to the periodic switching of the switches to generate a periodically changing switching signal. When the signal is fed to the resonant tank 103, the magnetizing inductor $L_m$ is excited to repeatedly generate voltage and induction electromotive force. Since the primary winding $N_{p1}$, ..., $N_{p4}$ of the transformer 104 is connected in series with the resonant inductor $L_r$ and the resonant capacitor $C_r$ of the resonant tank 103, and is connected in parallel with the magnetizing inductor $L_m$, enabling the formation of the primary side current in the circuit that changes according to the sinusoidal law, and the secondary side windings $N_{s1}$, $N_{s2}$, ..., $N_{s7}$, $N_{s8}$ of the transformer 104 continue to generate periodically varying current, which are rectified and filtered by the rectifying and filtering circuit 105 to convert the periodically varying current into output DC current for providing DC output voltage $V_o$ to the load $R_L$. Basically, once the circuit topology of the LLC resonant converter 100 is finalized, its resonant tank parameters are then determined and cannot be adjusted for different operating scenarios. That is, output voltage or output current range of the LLC resonant converter 100 cannot be adjusted according to its operational needs.

In order to improve the power density of LLC resonant converter and increase its output voltage or output current range. The present invention proposes to adjust the output voltage and output current ranges of the LLC resonant converter through varying the parameter of the resonant tank by changing the resonant inductance and capacitance, enabling that the ranges of output voltage or output current can be adapted in each output interval.

The technical means proposed by the present invention is to change the resonant tank parameters of the LLC resonant converter through designing an LLC resonant converter 200 with a variable resonant tank, for obtaining a larger output voltage or output current range to improve the power density of the LLC resonant converter.

Figure 2:
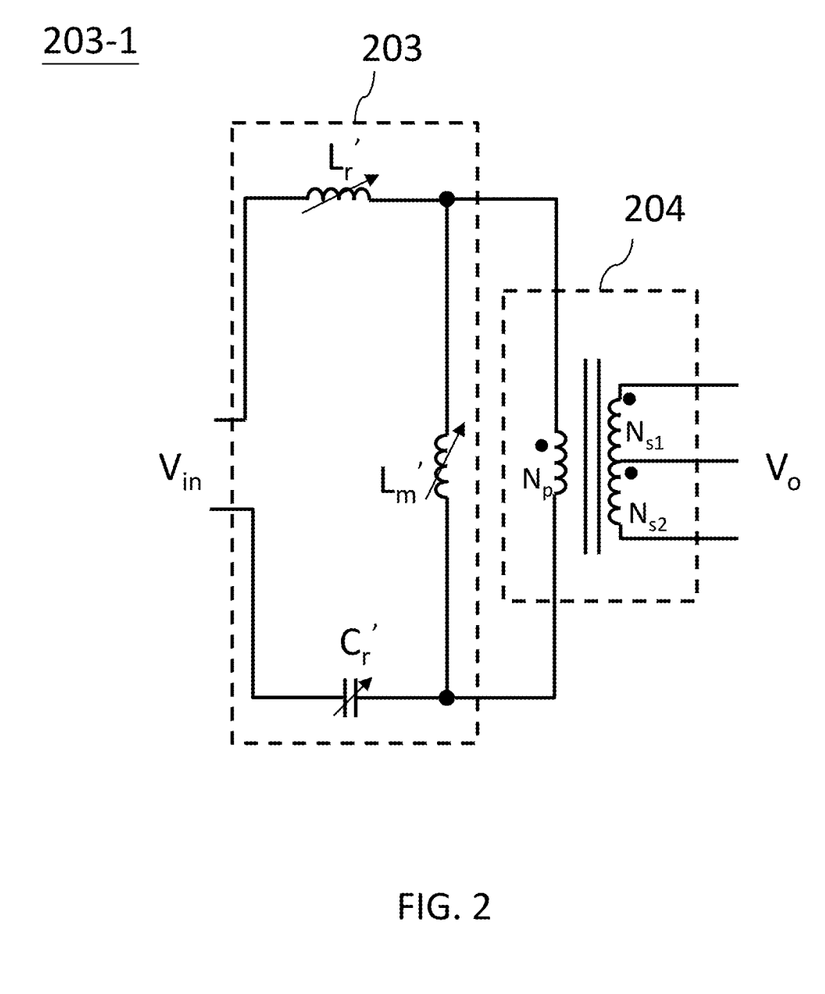
FIG. 2 illustrates a schematic circuit diagram of a variable resonant tank design of an LLC resonant converter according to one embodiment of the present invention.

FIG. 2 shows the circuit block 203-1 of resonant tank and transformer circuit, where the resonant tank 203 is electrically coupled to the transformer circuit 204 in the LLC resonant converter with a variable resonant tank proposed by the present invention, according to the aforementioned design concept. As depicted in FIG. 2, adjustments of the parameters of the resonant tank can be accomplished through adjusting $L_r$, $L_m$ and $C_r$, so that the required voltage gain can be achieved by varying the operating frequency $f_s$, and the characteristics of wide range of output voltage or output current can be achieved. The variable resonant inductor $L_r'$, the variable magnetizing inductor $L_m'$ and the variable resonant capacitor $C_r'$ are connected in series, and the primary side winding $N_p$ of the transformer circuit 204 is connected in parallel with the variable excitation inductor $L_m'$.

The gain of the LLC resonant converter is represent by equation (1), if $L_r$, $L_m$, $C_r$ and N are all fixed values, where $L_r$ has the resonant inductance, $L_m$ has the magnetizing inductance, $C_r$ has the resonant capacitance and N has the turns ratio of the primary/secondary side winding of the transformer 204. The gain $M(f_s, K, Q)$ is determined by the output current $I_o$, the output voltage $V_o$ and the operating frequency $f_s$ of the LLC resonant converter. When $I_o$ and $V_o$ are the target values, the desired gain $M(f_s, K, Q)$ can be obtained by varying the operating frequency $f_s$.

$$M(f_s, K, Q) = \frac{1}{\sqrt{(1 + K - K(\frac{f_{r1}}{f_s}))^2 + Q^2(\frac{f_s}{f_{r1}} - \frac{f_{r1}}{f_s})^2}} \quad (1)$$

Where $K = L_r/L_m$ (inductance ratio), $$Q = \frac{\sqrt{L_r/C_r}\,\pi^2 I_o}{8N^2 V_o} \text{(quality factor)}, f_{r1} = \frac{1}{2\pi\sqrt{L_r C_r}},$$

and N is the turns ratio of the primary/secondary side winding of the transformer 204.

Figure 3A:
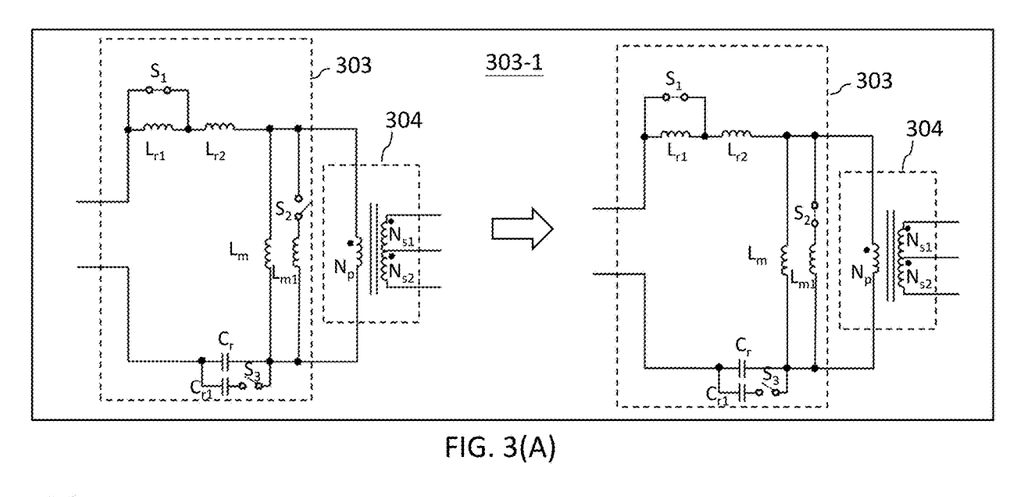
FIG. 3(A) illustrates one embodiment of the proposed variable resonant tank design of the LLC resonant converter.
Figure 3B:
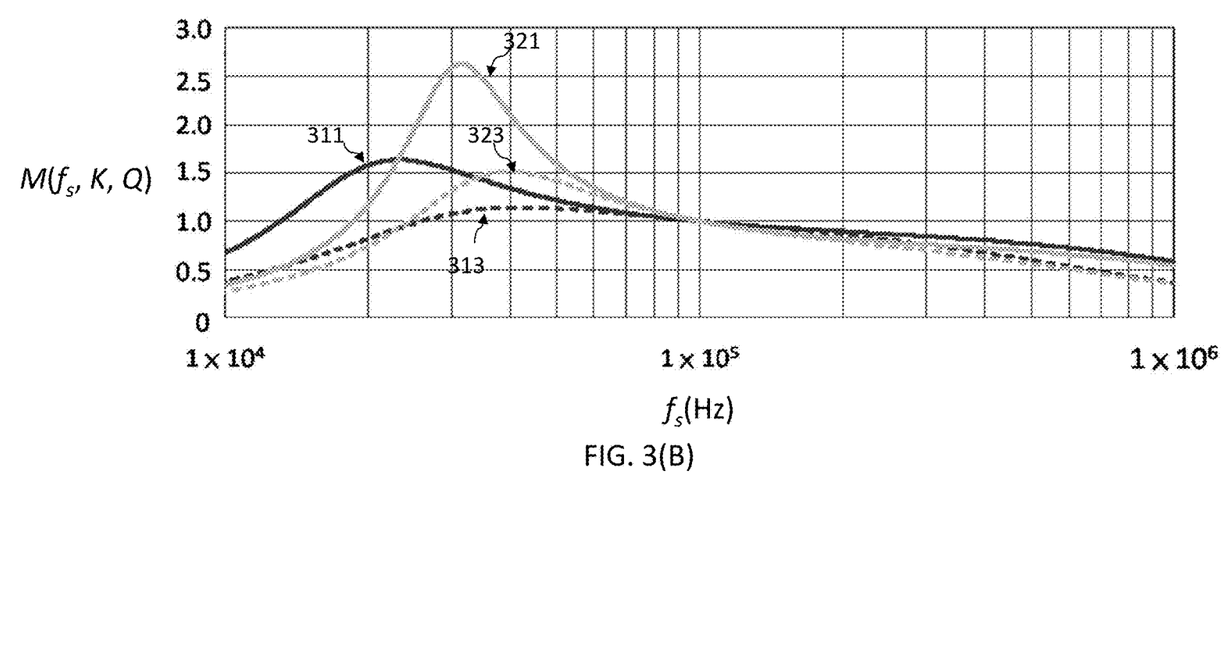
FIG. 3(B) illustrates the comparison of gain curves between the proposed variable resonant tank according to FIG. 3(A) and the original resonant design.

FIG. 3(A) shows one embodiment of a schematic diagram of the design of the variable resonant tank of the LLC resonant converter proposed by the present invention, and the diagram directly depicts the circuit block 303-1 of resonant tank and transformer showing the variable resonant tank 303 electrically coupled to the transformer circuit 304. The initial state of the circuit block 303-1 of resonant tank and transformer is set by default that the switch S1 is turned on and both of the switches S2 and S3 are turned off (i.e., the left of FIG. 3(A)). In the initial state, while the parameters of the resonant tank are fixed, varying the values of $I_o$ and $V_o$ will also change the value of Q. In the initial state, curves depict gain $M(f_s, K, Q)$ of the LLC resonant converter versus operating frequency $f_s$ according to the change of the values of Q are illustrated as curves 311 and 313 in FIG. 3(B). In the initial state, if the required $I_o$ of the LLC resonant converter increases, the value of Q changes from Q1 to Q2, and the maximum DC gain changes from more than 1.5 (curve 311) to lower than 1.5 (curve 313), the LLC resonant converter cannot be operated to obtain the required gain value (a threshold gain value). At this moment, if the switch S2 is turned on (i.e., the right of FIG. 3(A)), compared with the initial state, the $L_m$ value of the resonant tank will be changed from a fixed value to a variable $L_m'$ (i.e. $L_m/L_{m1}$), which includes the initial fixed magnetizing inductor $L_m$ electrically coupled to the first inductor $L_{m1}$, and the equivalent resonant tank parameter $L_m'$ (that is, the variable magnetizing inductance) can be adjusted by turning on the switch S2 to obtain the varied K1 parameter (changed from K to K1), as shown in FIG. 3(B). In this state, if the required $I_o$ of the LLC resonant converter increases, the value of Q changes from Q1 to Q2, corresponding curves depict gain $M(f_s, K, Q)$ of the LLC resonant converter versus operating frequency $f_s$ according to the change of the values of Q are illustrated as curves 321 and 323 in FIG. 3(B). That is, under K1, while the curves of gain $M(f_s, K, Q)$ of the LLC resonant converter varies from Q1 to Q2, the corresponding maximum DC gain of Q2 (curve 323) is still greater than the threshold gain value 1.5, which can meet the gain requirement of the LLC resonant converter.

The examples mentioned above are only used as examples, and the ways of electrical coupling between $L_m$ and $L_{m1}$ can have many different combinations. According to different applications, the electrical coupling between $L_m$ and $L_{m1}$ can be chosen in series or parallel, which are not listed here one by one. The above example is for illustrative purposes only, and is not intended to limit the scope of the claims of the present invention.

In an embodiment, the inductance of the first inductor $L_{m1}$ can be the leakage inductance of the transformer itself or external coupled inductance, which can be obtained through changing the windings of the magnetic element by any form of switches such as a switching element or a relay, or through connecting external magnetic element in series or in parallel. In this way, the inductance value in the resonant tank can be adjusted, and then the resonance parameter K (i.e., inductance ratio $L_r/L_m$) is dynamically adjusted, so that the gain curve $M(f_s, K, Q)$ can be dynamically adjusted according to the $I_o$ requirement.

In an embodiment, the adjustment of the resonance parameter K through adjusting changing the windings of the magnetic element or adding an external magnetic element in series or in parallel, which can be realized by arranging a plurality of switches between the windings. The plurality of switches can be switches of any form, such as switching elements, transistor switches, or relays.

Figure 4A:
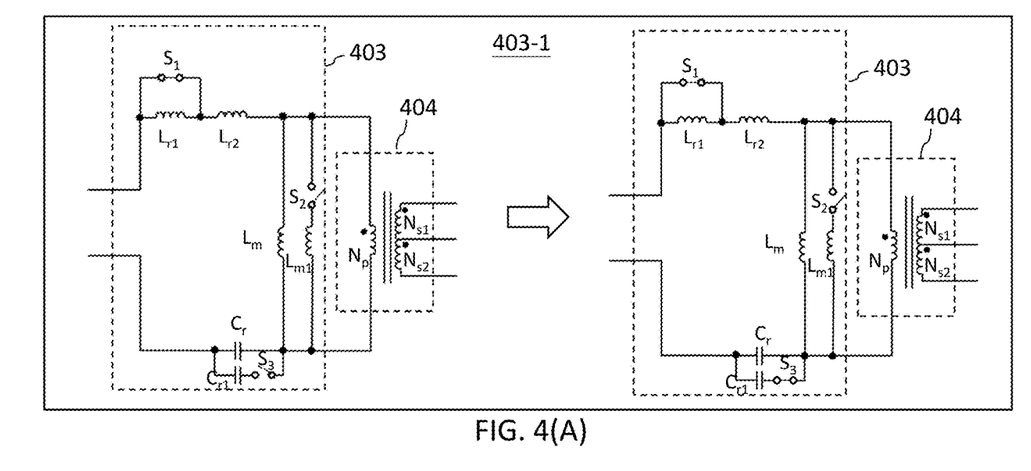
FIG. 4(A) illustrates the other embodiment of the proposed variable resonant tank design of the LLC resonant converter.
Figure 4B:
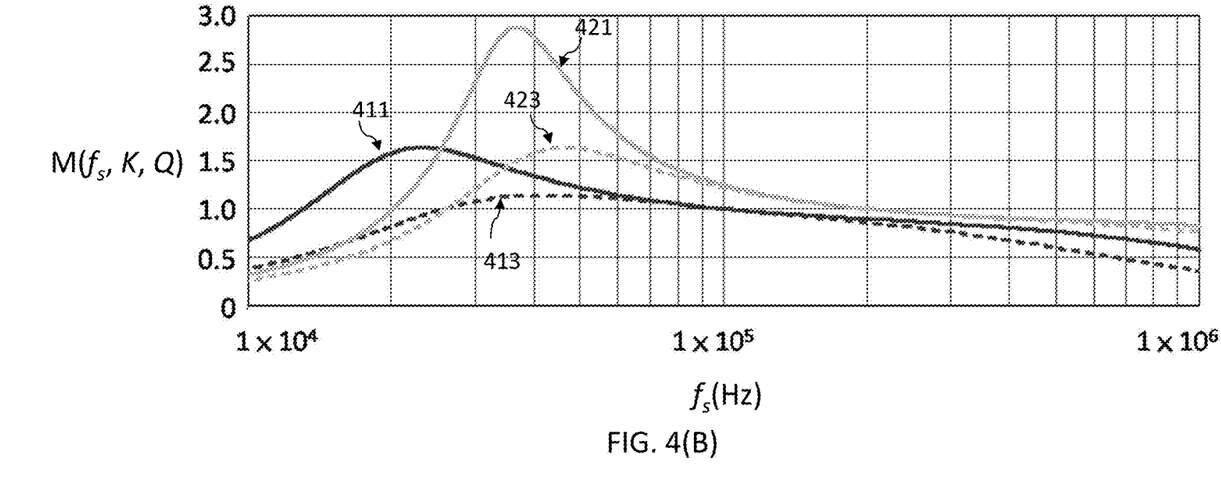
FIG. 4(B) illustrates the comparison of gain curves between the proposed variable resonant tank according to FIG. 4(A) and the original resonant design.

FIG. 4(A) shows the other embodiment of a schematic diagram of the design of the variable resonant tank of the LLC resonant converter proposed by the present invention, and the diagram directly depicts the circuit block 403-1 of resonant tank and transformer showing the variable resonant tank 403 electrically coupled to the transformer circuit 404. The initial state of the circuit block 403-1 of resonant tank and transformer is set by default that the switch S1 is turned on and both of the switches S2 and S3 are turned off (i.e., the left of FIG. 4(A)). In the initial state, while the parameters of the resonant tank are fixed, varying the values of $I_o$ and $V_o$ will also change the value of Q. In the initial state, curves depict gain $M(f_s, K, Q)$ of the LLC resonant converter versus operating frequency $f_s$ according to the change of the values of Q are illustrated as curves 411 and 413 in FIG. 4(B). In the initial state, if the required $I_o$ of the LLC resonant converter increases, the value of Q changes from Q1 to Q2, and the maximum DC gain changes from more than 1.5 (curve 411) to lower than 1.5 (curve 413), the LLC resonant converter cannot be operated to obtain the required gain value (a threshold gain value). At this moment, if the switch S3 is turned on (i.e., the right of FIG. 4(A)), compared with the initial state, the $C_r$ value of the resonant tank will be changed from a fixed value to a variable $C_r'$ (i.e., $C_r'=C_r+C_{r1}$), which includes the initial fixed resonant capacitor $C_r$ electrically coupled to the first capacitor $C_{r1}$, and the equivalent resonant tank parameter $C_r'$ (that is, the variable resonant capacitance) can be adjusted by turning on the switch S3 to obtain the varied Q parameter (changed from Qc to Qd) while maintaining K, as shown in FIG. 4(B). In this state, if the required $I_o$ of the LLC resonant converter increases, the value of Q changes from Qc to Qd, corresponding curves depict gain $M(f_s, K, Q)$ of the LLC resonant converter versus operating frequency $f_s$ according to the change of the values of Q are illustrated as curves 421 and 423 in FIG. 4(B). That is, under the same K, while the curves of gain $M(f_s, K, Q)$ of the LLC resonant converter varies from Qc to Qd, the corresponding maximum DC gain of Qd (curve 423) is still greater than the threshold gain value 1.5, which can meet the gain requirement of the LLC resonant converter.

The examples mentioned above are only used as examples, and the ways of electrical coupling between $C_r$ and $C_{r1}$ can have many different combinations. According to different applications, the electrical coupling between $C_r$ and $C_{r1}$ can be chosen in series or parallel, which are not listed here one by one. The above example is for illustrative purposes only, and is not intended to limit the scope of the claims of the present invention.

In one embodiment, the capacitance of the first capacitor $C_{r1}$ can be a stray capacitance or an external capacitance, and the capacitance value in the resonant tank can be varied through coupling $C_r$ and $C_{r1}$ in series or in parallel by any form of switch such as a switching element, a relay, or the like.

In an embodiment, arrangement of capacitors $C_r$ and $C_{r1}$ coupled in series or in parallel to change the capacitance value in the resonant tank can be achieved by configuring a plurality of switches between different capacitors.

Figure 5A:
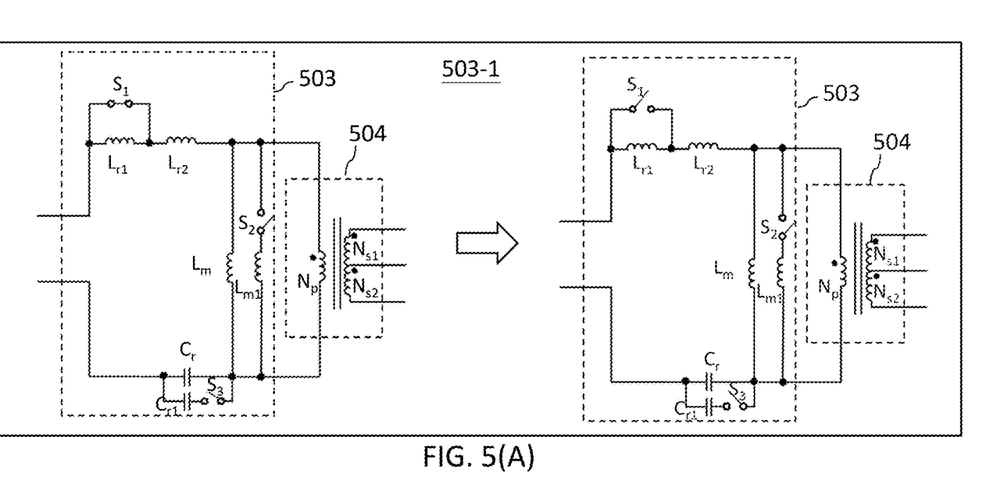
FIG. 5(A) shows yet another embodiment of the proposed variable resonant tank design of the LLC resonant converter.
Figure 5B:
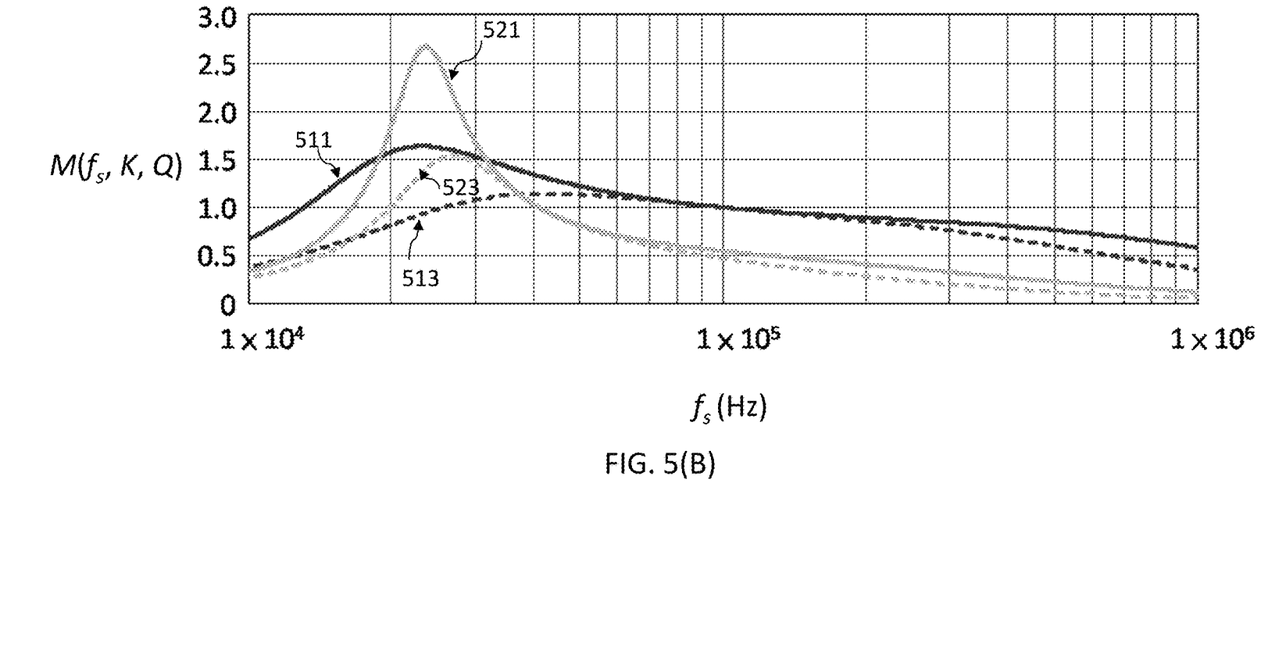
FIG. 5(B) illustrates the comparison of gain curves between the proposed variable resonant tank according to FIG. 5(A) and the original resonant design.

FIG. 5(A) shows another embodiment of a schematic diagram of the design of the variable resonant tank of the LLC resonant converter proposed by the present invention, and the diagram directly depicts the circuit block 503-1 of resonant tank and transformer showing the variable resonant tank 503 electrically coupled to the transformer circuit 504. The initial state of the circuit block 503-1 of resonant tank and transformer is set by default that the switch S1 is turned on and both of the switches S2 and S3 are turned off (i.e., the left of FIG. 5(A)). In the initial state, while the parameters of the resonant tank are fixed, varying the values of $I_o$ and $V_o$ will also change the value of Q. In the initial state, curves depict gain $M(f_s, K, Q)$ of the LLC resonant converter versus operating frequency $f_s$ according to the change of the values of Q are illustrated as curves 511 and 513 in FIG. 5(B). In the initial state, if the required $I_o$ of the LLC resonant converter increases, the value of Q changes from Q1 to Q2, and the maximum DC gain changes from more than 1.5 (curve 511) to lower than 1.5 (curve 513), the LLC resonant converter cannot be operated to obtain the required gain value (a threshold gain value). At this moment, if the switch S1 is turned off (i.e., the right of FIG. 5(A)), compared with the initial state, the $L_r$ value of the resonant tank will be changed from a fixed value to a variable $L_r'$ (i.e., $L_r'=L_r+L_{r1}$), which includes the initial fixed resonant inductor $L_r$ electrically coupled to the second inductor $L_{r1}$, and the equivalent resonant tank parameter $L_r'$ (that is, the variable resonant inductor) can be adjusted by turning off the switch S1 to obtain the both varied K and Q parameters. As shown in FIG. 5(B), in this state, if the required $I_o$ of the LLC resonant converter increases, the value of K changes from K to K2 while the value of Q changes from Q3 to Q4, corresponding curves depict gain $M(f_s, K, Q)$ of the LLC resonant converter versus operating frequency $f_s$ according to the change of the values of K's and Q's are illustrated as curves 521 and 523 in FIG. 5(B). That is, under the above conditions, while the curves of gain $M(f_s, K, Q)$ of the LLC resonant converter varies from K, Q3 to K2, Q4, the corresponding maximum DC gain of K2, Q4 (curve 523) is still greater than the threshold gain value 1.5, which can meet the gain requirement of the LLC resonant converter.

The examples mentioned above are only used as examples, and the ways of electrical coupling between $L_r$ and $L_{r1}$ can have many different combinations. According to different applications, the electrical coupling between $L_r$ and $L_{r1}$ can be chosen in series or parallel, which are not listed here one by one. The above example is for illustrative purposes only, and is not intended to limit the scope of the claims of the present invention.

In one embodiment, inductance of the second inductor $L_{r1}$ can be the leakage inductance of the transformer itself or an external coupled inductance, which can be obtained through changing the windings of the magnetic element by any form of switches such as a switching element or a relay, or through connecting external magnetic element in series or in parallel by any form of switch such as a switching element, a relay, or the like.

In an embodiment, arrangement of inductor $L_r$ and $L_{r1}$ coupled in series or in parallel to change the inductance value in the resonant tank can be achieved by configuring a plurality of switches between different inductors.

In one embodiment, the switches S1, S2 and S3 may be switches in any form, such as switching elements, transistor switches, or relays.

Figure 6:
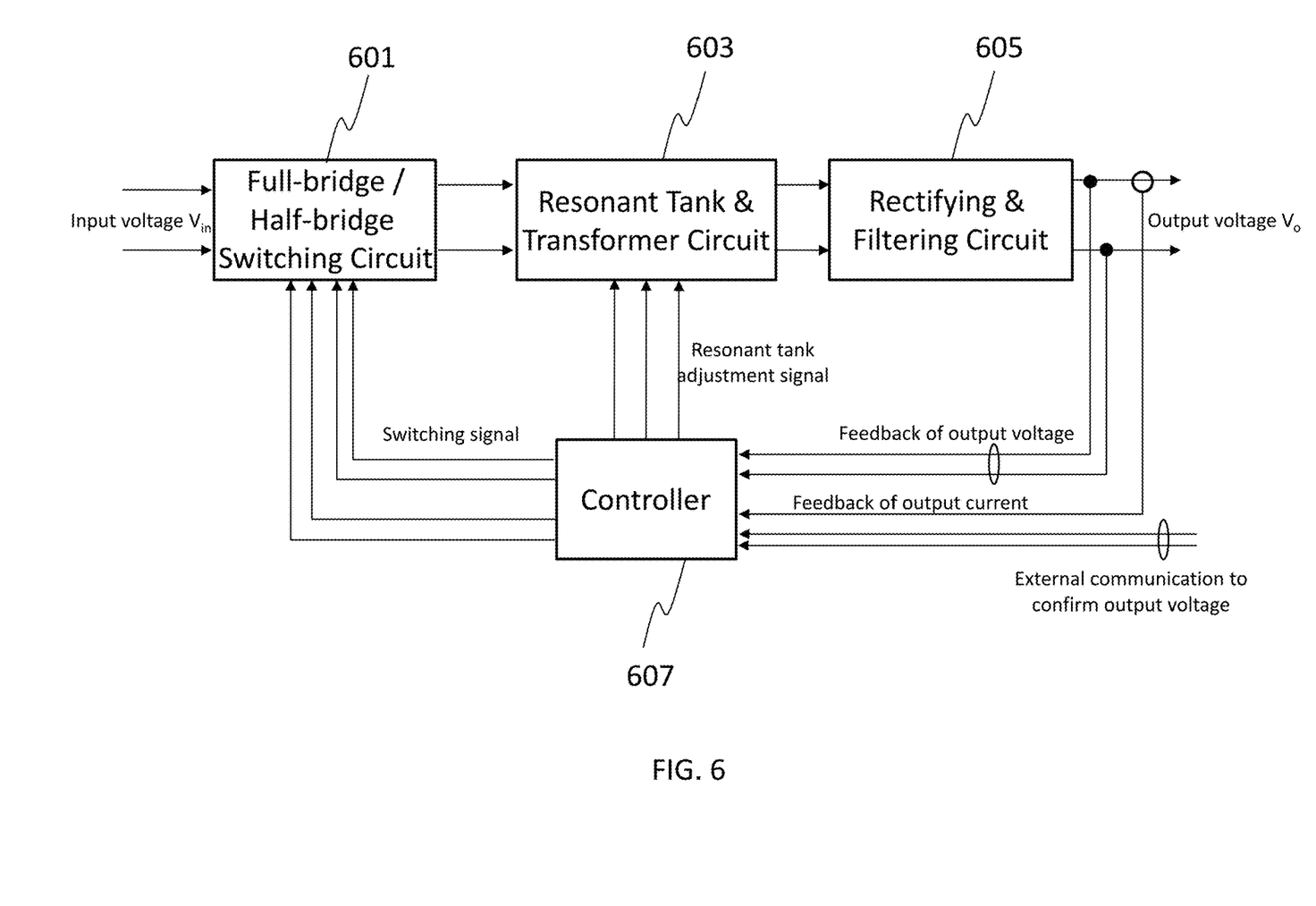
FIG. 6 illustrates a circuit block diagram and a related operation control flow of an LLC resonant converter according to an embodiment of the present invention.

FIG. 6 shows a circuit block diagram and a related operation control flow of an LLC resonant converter. The LLC resonant converter is used to convert an input DC voltage $V_{in}$ into an output DC voltage $V_o$ for supplying the load, which includes a full-bridge/half-bridge switching circuit 601, a resonant tank and transformer circuit 603, a rectifying and filtering circuit 605 and an external control circuit 607. The full-bridge/half-bridge switching circuit 601 is used to introduce a periodically changing switching signal input to the resonant tank and transformer circuit 603 coupled to it, through the external control circuit 607 by controlling turn-on or turn-off of the upper-bridge switches or the lower-bridge switches of the full-bridge/half-bridge switching circuit 601, enabling the current fed into the resonant tank and transformer circuit 603 repeatedly to generate voltage and induction electromotive force according to a sinusoidal law. The rectifying and filtering circuit 605 coupled to the secondary winding of the resonant tank and transformer circuit 603 rectifies and filters the varying current of the secondary winding to generate DC current $I_o$ and output DC voltage $V_o$ to be used by a load.

Functional block of the resonant tank and transformer circuit 603 contains a resonant tank (including $L_r$, $L_m$ and $C_r$ connected in series) coupled the full-bridge/half-bridge switching circuit 601 and a transformer circuit (including magnetic core, primary side winding $N_p$ and secondary winding $N_s$) coupled to the rectifying and filtering circuit 605 (operated with center-tapped rectification form). Among them, the specific implementation and design concept of the resonance tank and the transformer circuit 603 of the LLC resonant converter that proposed in the present invention can be referred to FIGS. 2-5. During the operation of the LLC resonant converter, the rectifying and filtering circuit 605 rectifies and filters the input signal (current or voltage) fed to the secondary side, and converts it into a DC output to provide DC output voltage $V_o$ to the load. The external control circuit 607 is coupled to the full-bridge/half-bridge switching circuit 601, the resonant tank and transformer circuit 603, and the rectifying and filtering circuit 605. The external control circuit 607 receives feedback of the output voltage, feedback of the output current and the external communication signals (to confirm the output voltage) of the LLC resonant converter, and can control the turn-on or turn-off of the upper-bridge switches or the lower-bridge switches in the full-bridge/half-bridge circuit 601 according to the feedback of output voltage, the feedback of output current and the external communication signals. In addition, the received feedback of output voltage and feedback of output current can be respectively used to adjust the resonant tank of the LLC resonant converter by sending resonant tank adjustment signals from the external controller 607. Therefore, inductance value of the magnetizing inductor $L_m$, capacitance value of the resonant capacitor $C_r$ and inductance value of the resonant inductor $L_r$ can be dynamically adjusted to achieve the purpose of varying the range of output voltage and output current of the LLC resonant converter.

In a preferred embodiment, the external control circuit 607 can be a microprocessor, a microcontroller (MCU), a digital signal processor (DSP) or a computing processing device with similar functions.

Basically, once the circuit topology of the LLC resonant converter is finalized, its resonant tank parameters $L_r$, $L_m$ and $C_r$ are determined and cannot be adjusted for different operating scenarios. That is, the range of its output voltage and output current cannot be adjusted according to its operational needs. When a wider output voltage or current range is required and the LLC resonant converter cannot adjust the operating frequency to achieve the required voltage gain value, a common solution is to use a two-stage power converter to achieve the required voltage gain. However, the efficiency of the two-stage power converter is low. The present invention proposed to adjust the parameters of the resonant tank by varying parameters of resonant tank $L_r$, $L_m$ and $C_r$, so that the required voltage gain can be achieved by adjusting the operating frequency $f_s$, and the characteristics of wide output voltage and current can be realized.

While various embodiments of the present invention have been described above, it should be understood that they have been presented by a way of example and not limitation. Numerous modifications and variations within the scope of the invention are possible. The present invention should only be defined in accordance with the following claims and their equivalents.

What is claimed is:

1. An LLC converter with variable resonant tank, said LLC converter comprising:
   a switching circuit coupled to an input DC voltage for converting said input DC voltage into a switching signal;
   a variable resonant tank coupled to said switching circuit, said variable resonant tank including a variable resonant inductor, a variable magnetizing inductor and a variable resonant capacitor connected in series to receive said switching signal for providing a primary current;
   a transformer circuit with a primary winding and a secondary winding, wherein said primary winding is coupled to said resonant tank; and
   a rectifying and filtering circuit coupled to said secondary winding configured to rectify and filter a secondary current outputted by said secondary winding for providing an output voltage;
   wherein said variable resonant tank is used to dynamically adjust gain curve of said LLC resonant converter based on required output current of said LLC resonant converter;
   wherein one end of said variable resonant inductor is electrically connected to said switching circuit and another end of said variable resonant inductor is connected in series to said primary winding;
   wherein said variable magnetizing inductor is connected in series to said variable resonant inductor, said variable resonant capacitor with one end is connected in series to said magnetizing inductor and said primary winding and with another end is connected to said switching circuit;
   wherein said variable magnetizing inductor is connected in parallel to said primary winding.

2. The LLC converter with variable resonant tank of claim 1, wherein said variable magnetizing inductor includes an magnetizing inductor with a fixed inductance value electrically coupled to a first inductor, said variable resonant inductor includes a resonant inductor with a fixed inductance value electrically coupled to a second inductor, and said variable resonant capacitor includes a resonant capacitor with a fixed capacitance value electrically coupled to a first capacitor; wherein said variable magnetizing inductor, said variable resonant inductor and said variable resonant capacitor are individually and dynamically adjusted through configuring a plurality of switches between said magnetizing inductor with a fixed inductance value and said first inductor, between said resonant inductor with a fixed inductance value and said second inductor, and between resonant capacitor with a fixed capacitance value and said first capacitor.

3. The LLC converter with variable resonant tank of claim 2, wherein inductance value of said first inductor is leakage inductance of said transformer circuit or inductance of an external coupled inductor, inductance value of said variable magnetizing inductor is adjusted through changing windings of magnetic component of said variable resonant tank or through coupling external magnetic elements in series or in parallel.

4. The LLC converter with variable resonant tank of claim 3, wherein said inductance value of said variable magnetizing inductor is dynamically adjusted by varying one of parameters of said variable resonant tank K, which is inductance ratio between resonant inductor and magnetizing inductor, enabling that said gain curve of said LLC resonant converter is dynamically varied according to said required output current of said LLC resonant converter.

5. The LLC converter with variable resonant tank of claim 2, wherein said plurality of switches include transistor type switching devices or relays.

6. The LLC converter with variable resonant tank of claim 2, wherein capacitance value of said first capacitor of variable resonant capacitor is a stray capacitance or capacitance of an external capacitor, capacitance value of said variable resonant capacitor is adjusted through changing coupling between said first capacitor and said resonant capacitor with fixed value in series or in parallel by configuring a plurality of switches between said first capacitor and said resonant capacitor with fixed value.

7. The LLC converter with variable resonant tank of claim 6, wherein said capacitance value of said variable resonant capacitor is dynamically adjusted by varying one of parameters of said variable resonant tank Q, which is quality factor, enabling that said gain curve of said LLC resonant converter is dynamically varied according to said required output current of said LLC resonant converter.

8. The LLC converter with variable resonant tank of claim 2, wherein inductance value of said second inductor of said variable resonant inductor is leakage inductance of said transformer circuit or inductance value of an external coupled inductor, inductance value of said variable resonant inductor is adjusted through changing windings of magnetic component of said variable resonant tank or through coupling external magnetic elements in series or in parallel by configuring a plurality of switches between said second inductor and said resonant inductor with fixed value.

9. The LLC converter with variable resonant tank of claim 8, wherein said inductance value of said variable resonant inductor is dynamically adjusted by varying two parameters of said variable resonant tank Q and K, which are quality factor and inductance ratio respectively, enabling that said gain curve of said LLC resonant converter is dynamically varied according to said required output current of said LLC resonant converter.

10. The LLC converter with variable resonant tank of claim 2, wherein said plurality of switches are configured to dynamically adjust inductance value of said variable magnetizing inductor, capacitance of said variable resonance capacitor and inductance value of said variable resonant inductor by sending resonance tank adjustment signals to said resonant tank and said transformer circuit through an external controller electrically coupled to said LLC resonant converter, according to received feedback of output voltage and feedback of output current respectively to adjust range of the output voltage and output current of said LLC resonant power converter.

11. An LLC converter with variable resonant tank, said LLC converter comprising:
a switching circuit coupled to an input DC voltage for converting said input DC voltage into a switching signal;
a variable resonant tank coupled to said switching circuit, said variable resonant tank including a variable resonant inductor, a variable magnetizing inductor and a variable resonant capacitor connected in series to receive said switching signal for providing a primary current;
a transformer circuit with a primary winding and a secondary winding, wherein said primary winding is coupled to said resonant tank; and
a rectifying and filtering circuit coupled to said secondary winding configured to rectify and filter a secondary current outputted by said secondary winding for providing an output voltage;
wherein said variable resonant tank is used to dynamically adjust gain curve of said LLC resonant converter based on required output current of said LLC resonant converter;
wherein one end of said variable resonant inductor is electrically connected to said switching circuit and another end of said variable resonant inductor is connected in series to said primary winding;
wherein said variable magnetizing inductor is connected in series to said variable resonant inductor, said variable resonant capacitor with one end is connected in series to said magnetizing inductor and said primary winding and with another end is connected to said switching circuit;
wherein said variable magnetizing inductor is connected in parallel to said primary winding;
wherein said variable magnetizing inductor includes an magnetizing inductor with a fixed inductance value connected in parallel to a first inductor;
wherein said variable resonant inductor includes a resonant inductor with a fixed inductance value connected in series to a second inductor;
wherein said variable resonant capacitor includes a resonant capacitor with a fixed capacitance value connected in parallel to a first capacitor.

12. The LLC converter with variable resonant tank of claim 11, wherein inductance value of said variable magnetizing inductor is adjusted by turning on or off a first switch coupled between said magnetizing inductor with a fixed inductance value $L_m$ and said first inductor $L_{m1}$, such that effective magnetizing inductor is set to be said $L_m$ in parallel with said $L_{m1}$ while turning on said first switch, and said effective magnetizing inductor is set to be said $L_m$ only while turning off said first switch.

13. The LLC converter with variable resonant tank of claim 11, wherein capacitance value of said variable resonant capacitor is adjusted by turning on or off a second switch coupled between said resonant capacitor with a fixed capacitance value $C_r$ and said first capacitor $C_{r1}$, such that effective resonant capacitor is set to be said $C_r$ in parallel with said $C_{r1}$ while turning on said first switch, and said effective resonant capacitor is set to be said $C_r$ only while turning off said second switch.

14. The LLC converter with variable resonant tank of claim 11, wherein inductance value of said variable resonant inductor is adjusted by turning on or off a third switch coupled between said resonant inductor with a fixed inductance value $L_r$ and said second inductor $L_{r1}$, such that effective resonant inductor is set to be said $L_r$ in series with said $L_{r1}$ while turning off said first switch, and said effective magnetizing inductor is set to be said $L_m$ only while turning on said third switch.

15. The LLC converter with variable resonant tank of claim 12, wherein said inductance value of said variable magnetizing inductor is dynamically adjusted by varying one of parameters of said variable resonant tank K, which is inductance ratio between resonant inductance and magnetizing inductance, enabling that said gain curve of said LLC resonant converter is dynamically varied according to said required output current of said LLC resonant converter.

16. The LLC converter with variable resonant tank of claim 13, wherein said capacitance value of said variable resonant capacitor is dynamically adjusted by varying one of parameters of said variable resonant tank Q, which is quality factor, enabling that said gain curve of said LLC resonant converter is dynamically varied according to said required output current of said LLC resonant converter.

17. The LLC converter with variable resonant tank of claim 14, wherein said inductance value of said variable resonant inductor is dynamically adjusted by varying two parameters of said variable resonant tank Q and K, which are quality factor and inductance ratio respectively, enabling that said gain curve of said LLC resonant converter is dynamically varied according to said required output current of said LLC resonant converter.

18. The LLC converter with variable resonant tank of claim 11, wherein a plurality of switches are configured to dynamically adjust inductance value of said variable magnetizing inductor, capacitance of said variable resonance capacitor and inductance value of said variable resonant inductor by sending resonance tank adjustment signals to said resonant tank and said transformer circuit through an external controller electrically coupled to said LLC resonant converter, according to received feedback of output voltage and feedback of output current respectively to adjust range of the output voltage and output current of said LLC resonant power converter.

19. The LLC converter with variable resonant tank of claim 18, wherein said external controller is a microprocessor, a microcontroller or a digital signal processor.

20. The LLC converter with variable resonant tank of claim 18, wherein said plurality of switches are switching devices, transistor type switches or relays.

* * * * *